United States Patent [19]

Simpson et al.

[11] Patent Number: 5,404,580
[45] Date of Patent: Apr. 4, 1995

[54] RADIO HAVING MEMORY MEANS FOR STORING RADIO USER VALIDATION CODE

[75] Inventors: Harold E. Simpson, Hellerup; Poul E. Sogaard Rasmussen, Glostrup, both of Denmark

[73] Assignee: Motorola, Inc., Schaumburg, Ill.

[21] Appl. No.: 238,193

[22] Filed: May 4, 1994

Related U.S. Application Data

[63] Continuation of Ser. No. 760,541, Sep. 16, 1991, abandoned.

[51] Int. Cl.6 .......................... H04B 1/38; H04M 1/00
[52] U.S. Cl. .................................. 455/89; 455/186.1; 379/357
[58] Field of Search ................ 455/89, 90, 128, 186.1, 455/186.2; 379/58–59, 357

[56] References Cited

U.S. PATENT DOCUMENTS

| | | | |
|---|---|---|---|
| 4,525,865 | 6/1985 | Mears | 455/186.2 |
| 4,759,056 | 7/1988 | Akiyama | 379/357 |
| 4,843,588 | 6/1989 | Flynn | 455/186.1 |
| 5,060,295 | 10/1991 | Borras et al. | 455/186.1 |
| 5,109,540 | 4/1992 | Dzung et al. | 455/89 |
| 5,155,860 | 10/1992 | McClure | 455/89 |

FOREIGN PATENT DOCUMENTS

| | | | |
|---|---|---|---|
| 3838677 | 5/1990 | Germany | 455/89 |
| 1180135 | 7/1989 | Japan | 455/89 |

OTHER PUBLICATIONS

"Spread Spectrum Goes Commercial", *IEEE Spectrum*, Schilling et al; Aug. 1990; pp. 40–41 and 44–45.

*Primary Examiner*—Reinhard J. Eisenzopf
*Assistant Examiner*—Andrew Faile
*Attorney, Agent, or Firm*—Kenneth W. Bolvin; Lesley Rhyne

[57] ABSTRACT

A radio (e.g. a cellular radio telephone) is provided which is capable of operating with a set of incoming and outgoing call functions. Removable memory means 132 are provided (e.g. a smart card) for storing radio function selecting information 133 and a radio user validation code. The radio communicates with a radio communications system in response to the code for enabling the radio to receive incoming calls at least. Radio function control means activate a subset of the call functions within the set of call functions in response to the radio function selecting information stored in the removable memory means.

22 Claims, 3 Drawing Sheets

FIG. 1 —PRIOR ART—

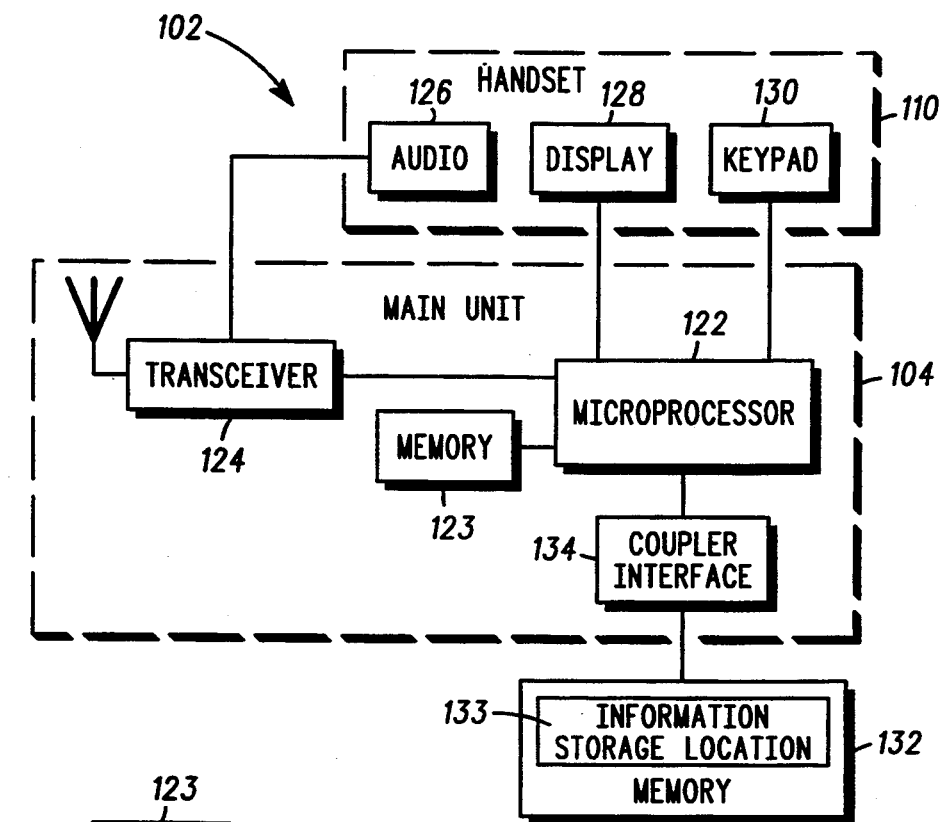
FIG. 3
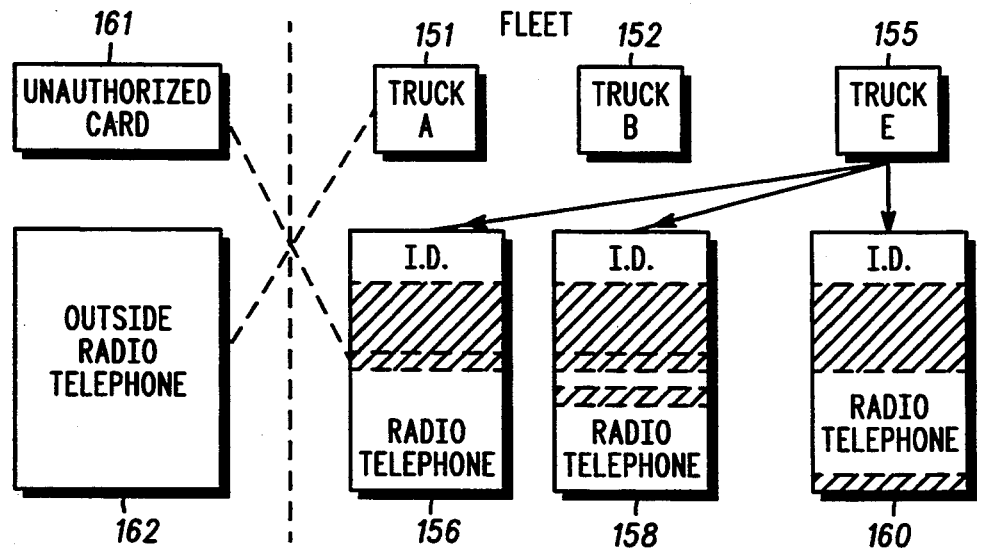
FIG. 5
FIG. 4

RADIO HAVING MEMORY MEANS FOR STORING RADIO USER VALIDATION CODE

This is a continuation of application Ser. No. 07/650,541, filed Sep. 16, 1991, and now abandoned.

FIELD OF THE INVENTION

This invention relates to radios. The invention particularly relates to radios the operation of which is determined by removable memory means which may for example be a card mounted microprocessor, hereinafter referred to as a "smart card".

BACKGROUND OF THE INVENTION

In the German OEBL-C cellular radio system, radiotelephones are provided which can be tested by the manufacturer using a service card with a dedicated data field. On insertion of the service card into the radiotelephone, the radiotelephone enters a service mode, and test programs are executed. During a service mode the operation of the radiotelephone is tested. For example, range information is tested, the memory is read and/or a test call is performed whereby a service number is called which connects the radiotelephone to a local base station, in response to which the base station transmits a tone signal back to the radiotelephone. With the radiotelephone in a service mode it is not possible for a user to make outgoing calls other than the fixed test call and is not possible to receive incoming calls.

In the GSM pan-European digital cellular radio system, it is intended that subscribers will be issued with smart cards, hereafter referred to as subscriber identity cards, for authorizing subscribers to use the cellular radio system and for identifying the subscriber who is to be billed for the service. Such a system in principal allows a subscriber to use any item of subscriber equipment and to be billed to the same bill irrespective of the equipment used.

An example of an item of GSM subscriber equipment is a mobile radiotelephone which is enabled for use on insertion of a subscriber identity card. A subscriber validation code, which is unique for each user, is permanently programmed into a memory of the card, whereby on insertion of the card into the radio the validation code is read from the card and transmitted to a base station local to the radio. The base station then checks the validation code and sends a signal back to the radio so as to enable the radio for operation. Once enabled the radiotelephone can provide all the call functions which are available with the radiotelephone, which will depend on its type. The call functions may include, for example, incoming and outgoing calls, international calls, abbreviated dialling using preprogrammed numbers stored in a memory internal to the telephone, use of a telephone answering machine service, and use of data equipment such as fax machines. Such functions are well known in the art.

A subscriber on the GSM system can subscribe to one of a number of levels of subscription. The full service may be subscribed for, which means that the subscriber may make calls anywhere within the European-wide area covered by the service and may make international calls. Alternatively a national-call only service may be subscribed for which means that calls may only be made from within a home nation to within the same nation.

Other levels of service may be offered by a service operator. The level of service is identified within the system, rather than at the subscriber equipment. I.e. when a subscriber attempts to make a call and his subscriber ID is transmitted to a base station, a check is made at the base station or its local controller to determine whether the subscriber is authorized to make the call which is being attempted. If he is not authorized, e.g. through having subscribed for a more limited service (or through non-payment of bill or otherwise), no authorization signal is transmitted back to the subscriber unit and no handshake occurs.

In the GSM specification Recommendation 02.07 version 3.1.0 of 15 Apr. 1989, a fixed number call feature is described whereby, by use of an electronic lock, it is possible to place a bar on calling any numbers other than those preprogrammed in the mobile station. The service described has two sub-categories: all calls are made to only one predetermined number, or calls may be made to several predetermined numbers, the required number being selected by means of an abbreviated address code. In both cases, the actual directory number is transmitted on the radio path. These features are implemented in the mobile unit (rather than the card). A suitable electronic lock would be a number to be entered in the keypad. It is also possible to provide a group call facility whereby the GSM mobile operates like a private exchange. This is implemented at the switch.

FIG. 1 shows the organization of the memory fields of a GSM Subscriber Identity Module (smart card). In this figure a root directory 10 is shown at memory location #3F00. Through this directory, access can be gained to card-holder data field 11, administrative data field 12 and SIM identification data field 13 and to a GSM directory 14 and a telecom directory 15. The data fields 11, 12 and 13 are for administration purposes for the benefit of the system operator.

GSM directory 14 gives access to 8 further data fields 16 to 23. Field 16 gives the SIM serial number, field 17 (IMSI) gives the identification number identifying the subscriber, field 18 (KI) gives a key for the authentication algorithm, field 19 (TMSI) gives a temporary registration number which is a substitute for the IMSI and gives a number (LAI) identifying the current cell. Field 20 gives a key (Kc) for encryption of speech and gives a ciphering key sequence number (n). Field 21 gives the operator identifier (PLMN), which also identifies the country, field 22 gives details of a broadcasting channel (PCTH) to which the mobile locks, eg frequency details thereof, and field 23 provides information on the initial channel accessed, for traffic control purposes.

Root directory 10 also gives access to a telecom directory 15. From the user's point of view, the contents of this directory are of greatest interest. Field 24 contains abbreviated dial telephone numbers, field 25 gives call set up information for the purposes of abbreviated dialling. Field 25 identifies whether the call is regular speech or, if it is a data call, it identifies the baud rate, package switching format etc. Field 26 is available for storing up to five predefined or received messages, to a maximum of 180 characters. Field 27 contains predetermined numbers for dialling, and when the user has blocked outgoing calls, only these numbers can be dialled. Field 28 counts charge pulses for the purposes of billing.

The above described systems do not allow a subscriber to control the manner in which his subscriber card may be used, beyond the limited choice of levels of service available from the service operator.

SUMMARY OF THE INVENTION

It is an object of the present invention to provide a more flexible radio system.

In accordance with the present invention there is provided a radio capable of operating with a set of incoming and outgoing call functions, said radio comprising:

removable memory means for storing radio function selecting information and a radio user validation code;

memory receiving means for temporarily receiving said removable memory means; and radio function control means coupled to said memory receiving means for enabling said radio for communication with a radio communications system in response to said radio user validation code including at least enabling said radio for receipt of incoming calls, characterized in that said radio function control means are arranged to activate a subset of said call functions within said set of call functions in response to the radio function selecting information stored in said removable memory means.

In an embodiment of the invention, the radio further comprises a memory having a plurality of storage locations for storing information including for example number information. The radio function control means are arranged so as to disallow access (e.g. read and write access) to at least one of the plurality of storage locations in response to the radio function selecting information stored in the removable memory means.

In a further embodiment of the invention, the radio function control means are arranged to activate the radio for receipt of incoming calls and to deactivate all outgoing call functions in response to the radio function selecting information.

Thus, the invention provides for a radio which is capable of operating with a set of call functions but is arranged whereby in use a only subset of call functions within the set are available for use by certain people.

BRIEF DESCRIPTION OF THE DRAWINGS

FIG. 3 shows a block schematic circuit diagram of the radiotelephone of FIG. 2.

FIGS. 4 and 5 show a diagrammatic representation of an implementation of the radiotelephone in accordance with the present invention.

DETAILED DESCRIPTION OF THE PREFERRED EMBODIMENT

Figure 2:
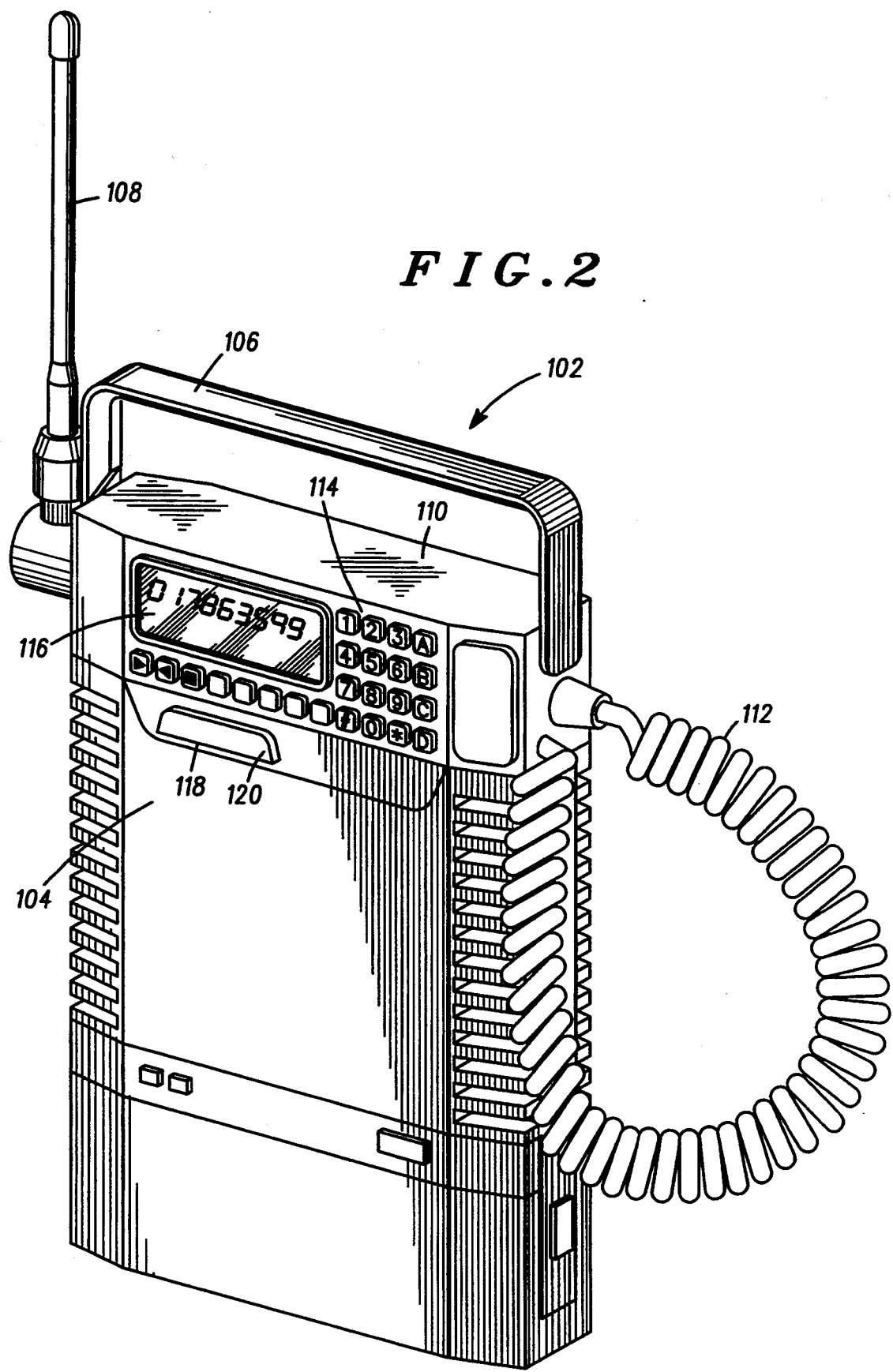
FIG. 2 shows a perspective view of a radiotelephone in accordance with the invention.

Referring to FIG. 2, a radiotelephone 102 in accordance with the invention is shown, which comprises a main unit 104 having a handle 106 an antenna 108 and a handset 110 coupled to the main unit 104 by a cable 112.

Figure 1:
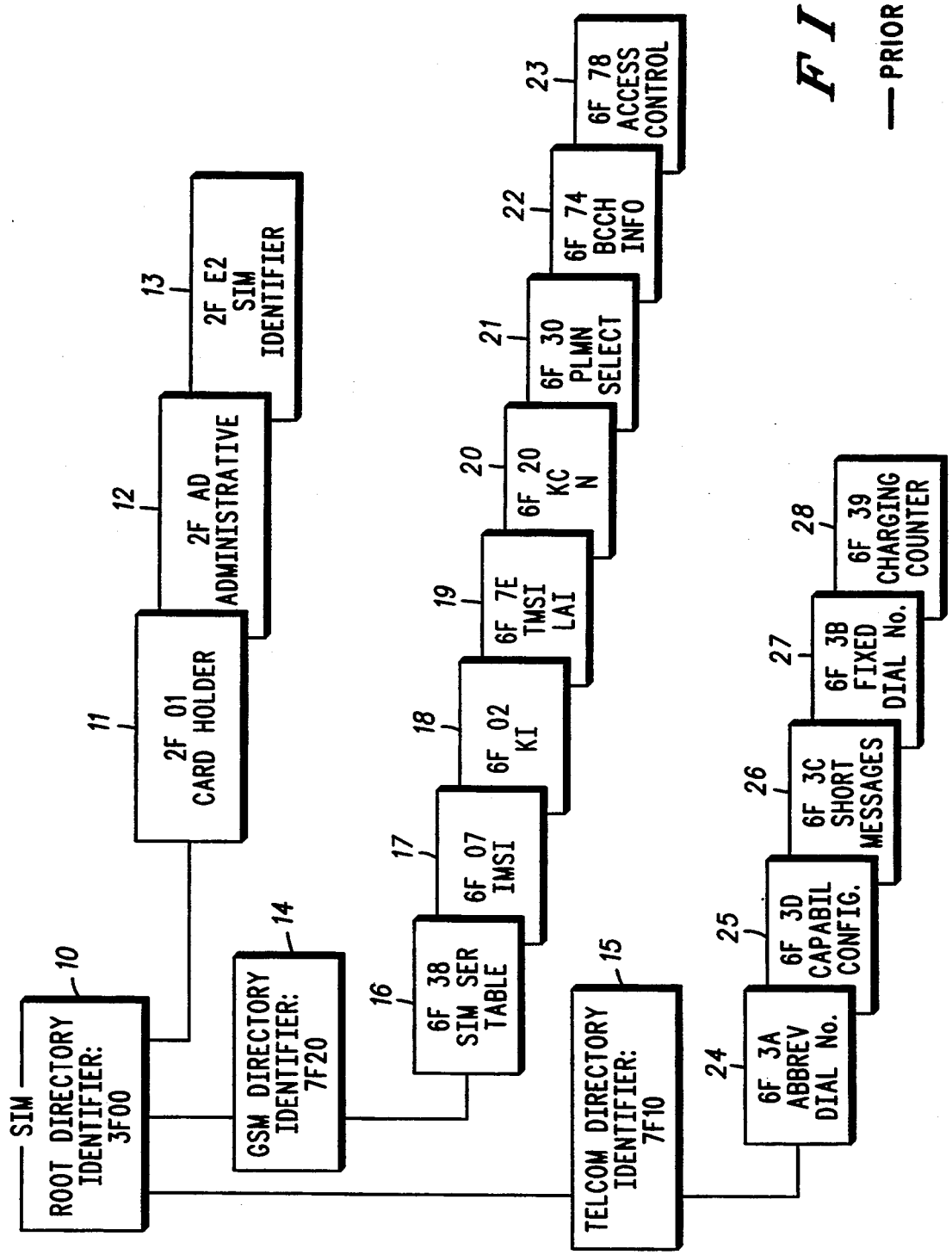
FIG. 1 shows the organization of the memory fields of a subscriber identity card in accordance with the prior art.

The handset 110 has, on a side which is not shown in FIG. 1, an ear piece and a mouth piece. On another side, the handset 110 has a visual display 116 and a keypad 114 which in addition to number keys 0-9 may include special function keys, such as an abbreviated dial key.

The main unit 104 is also provided with a receiving slot 118 adjacent the handset location for receiving a smart card 120 in order that the radiotelephone may operate. The card 120 protrudes from the receiving slot 118 so as to facilitate later removal.

Referring now also to FIG. 3, the radiotelephone 102 comprises a microprocessor 122, a memory 123 having a plurality of memory locations for storing for example telephone numbers for abbreviated dialling, a coupler interface 134 and a radio transceiver 124. In the handset 110 an audio section 126, a display section 128 and keypad section 130 are also provided.

The card 120 comprises a microprocessor (not shown) and a memory 132 which may be ROM or EEPROM for example. The memory may have substantially the same organization as shown in FIG. 1. The memory 132 has a radio function selecting information storage location 133, the use of which is described below. The major part of the memory 132 is programmed by the service operator while the storage locater 133 is programmed by the service operator or by the subscriber. The contents of the storage location 133 determines the number of functions of the radiotelephone to which the user of the memory card may have access. Thus, the radiotelephone owner such as an employer can limit the functions available to the radiotelephone user, such as an employee, by preprogramming a memory card with a predetermined number of functions. In the case of a memory having the organization shown in FIG. 1, the memory location 133 preferably resides in the telecom directory 15, but could reside in a separate data field accessible through the root directory 10. It is not necessary to have a separate data field for the memory location 133, but instead the first location #6F3A of the abbreviated dial data field 24 may be used, or some other user—accessible memory location.

The memory 132 is programmed with a subscriber validation code which is unique to each subscriber. This is equivalent to the IMSI stored in data field 17 of FIG. 1. It will be appreciated that the radiotelephone is inoperable unless a card having a valid subscriber validation code is inserted into the slot 118.

The radiotelephone 102, is arranged so that on insertion of a 'valid' card, it can provide a number of operating functions which are well known in the art. For example, a user of the radiotelephone may make outgoing calls, receive incoming calls, make international calls, and make calls using abbreviated dialling. In addition, the radiotelephone 102 may be coupled for operation with an answering machine and/or data equipment such as a fax machine.

In use the card 120 issued to the radiotelephone user is inserted into the slot 118 of the main unit 104. On insertion, the memory 132 of the card 120 is coupled to the microprocessor 122 via the coupler interface 123. The microprocessor reads the subscriber validation code from the memory 132 via the microprocessor on the card (not shown) and sends the validation code to the nearest base station for registration. This informs the cellular radio system of the location of the subscriber. The microprocessor 122 also reads the contents of the storage location 133. On the basis of this information it determines the functions of the radio telephone to which the holder of the card may have access. In response to this information it controls the transceiver 124, display section 128 and the keypad section 130 so that the radiotelephone 102 activates only those predetermined functions corresponding to the stored data.

If the information in the memory location 133 so permits, the user can initiate a call by means of the keypad 114. On so doing, the radiotelephone transmits the validation code to the nearest base station. If the validation code is valid the base station transmits a signal back to the radiotelephone whereby handshake is established and a communication channel is set up between the radio and the base station.

Examples of functions or subsets of functions will now be described, which may be activated or deactivated by the information in the storage location 133 of the card.

The instruction programmed into the card may operate to deactivate certain functions of the keypad, e.g. individual keys, individual sections of the display 116 and/or individual options or a menu displayed (i.e., individual subroutines in the program of the microprocessor 122). It will be noted that the card 120 still fulfils the function of subscriber validation and identification, because without these functions, the cellular radio system would be unable to locate the user. Thus, the radio is still active for making periodic transmissions to enable the cellular radio system to track its location.

A particularly useful embodiment is the deactivation of user dialling through the keypad, and the limiting of outgoing call function to dialling of numbers preprogrammed in the memory 32 of the card 20. An employer can issue a card which is programmed in this way to his employees and have total control over the numbers which can be called. Likewise a parent may wish to issue such a card to a child.

A further useful embodiment of the invention is the barring of outgoing calls of a particular nature, e.g. international or trunk calls. Such calls are recognized by the first few digits dialled. This feature is useful where such a level of service is not offered by the system operator.

In each of the preceding three embodiments, the bar could be removed by use of a code entered into the keypad.

As a further example, an instruction stored in the storage location 133 may prevent read and write accesses to all or to only specific memory locations of the radiotelephone's memory 123 and/or may to permit read accesses only to other specific memory locations of the radiotelephone's memory 123. Thus the function of the radio may be limited to the selection by the user of a number for dialling from a predetermined list, and the automatic dialling of the selected number. Thus, specific call functions may be activated in addition to the radiotelephone being activated, both to receive incoming calls and to make outgoing calls.

Referring now to FIG. 4, one implementation of a preferred embodiment of the invention is illustrated in which a truck company issues each of five truck drivers A-E with memory cards 151-155 having unique subscriber identification codes IDA-IDE to be used with five radiotelephones 156-160 each of which are associated with a particular truck TA-TE. Each of the radiotelephone memories 123 (FIG. 5) comprises 100 memory locations for abbreviated dial telephone numbers and of these the locations M1-M50 are preprogrammed with telephone numbers which are frequently used by the truck company.

The truck company can program the memory cards 151 to 155 so that the truck drivers have read access only to the memory locations M1-M50. Thus, the truck drivers can call the numbers stored in any one of the memory locations M1-M50 but they cannot write to those memory locations.

In addition., each of the truck drivers' memory cards 151-160 may be programmed so that those cards allow read and write access to different assigned memory locations of the memory 123 of the radiotelephones 156 to 160. Thus, irrespective of which truck truck driver A is driving he only has read and write access to certain assigned memory locations of the memory of the radiotelephone of that truck.

In the illustrated example, driver A has read and write access to memory locations M51 to M60 and it does not matter which truck he is driving on a particular day, because on insertion of his card into the radio telephone he will find that the same memory locations are accessed, while none of the other drivers has been able to change the data therein.

A further feature which may be provided is a crosscheck identification number (ID) in the memory 123 of each card 151-155 and the memory 123 of each radio telephone 156-60. The radiotelephones 156-160 are arranged to activate only if the crosscheck ID of one of the cards 151-155 is present in that card. This has a number of advantages (a) it protects the data in the radiotelephones 156-160 from reading or transferring by an unauthorized outsider 161 and (b) in a situation where the drivers A to E are not authorized to make outgoing calls other than to preprogrammed numbers and they have no write access to memory, a driver cannot take an unauthorized card 161 to reprogram one of the memories 156 to 160. Moreover, a driver cannot insert his card into an outsider's radiotelephone 162 and dial numbers preprogrammed into that radiotelephone.

The feature described immediately above has the advantage of enabling a subscriber to use the full capacity of the available memory 123 of radiotelephone to implement desired functions, rather than being limited to the memory space provided on the card 120 which, it must be remembered, is predetermined by the system operator. Substantial extra memory on a smart card can substantially increase its cost which is undesirable to a system operator if only a few users are likely to require additional memory space.

The private memory location A can be generated at the request of user A and dynamically extended as A enters further data. User B can subsequently do the same. Unless private memory for user B has specifically been created, A has access to the full memory.

In a further embodiment of the invention, the user is able to customize the operation of the mobile to his personal preference and the customizing data is stored in the card. In principle, any information of the type which is stored in a code plug of a conventional two-way radio can be stored in the card of the cellular mobile radiotelephone. This is advantageous in that, whereas the code plug of a conventional radio is permanently or semi-permanently mounted in the radio, the card of the cellular radiotelephone is readily removable, and is unique and serves its own independent function in that it contains the subscriber validation code. This means that each subscriber can carry with him a card uniquely identifying that subscriber and containing customizing data which means that when he starts up an item of subscriber equipment with that card, it will operate in his pre-selected manner. The customizing data can be altered at will by the user through menu options on the screen and through the keypad.

Particularly useful items of customizing data are: language selection, volume control, audible, visual or vibratory warning, and full or shortened menu selection (basic mode or extended mode).

Thus, for example, every mobile unit can store its screen text in every language of the EEC. While this is expensive in terms of memory capacity, there is a cost saving in terms of streamlining production and sales and there is an advantage to the customer in that if he is travelling abroad and wishes to use someone else's mobile unit, the screen of the mobile unit immediately shows up the customer's own language. Instead of controlling the language in accordance with customized data, the language can be controlled in accordance with the subscriber validation number. The subscriber unit identifies the country of origin of the card from the subscriber validation number or other permanent data and selects the language accordingly. This is less advantageous, because some countries have more than one language and it would be preferable to allow the user to select the language.

The ringer volume level can be selected and this level stored in the card memory. Likewise, the type of ringer could be selected.

In the case of the menu selected for display, the functions shown may be radio functions, peripheral equipment functions (e.g. answering machine functions) or a combination of both. This has the advantage of not over-complicating the equipment for the unsophisticated user, while presenting a sophisticated user with more functions.

Another aspect of the subscriber unit that can be "customized" and controlled as a function of the card is the disabling of data services, particularly broadcast SMS (short message service). SMS is a data service wherein data is received on the control channel (as opposed to the traffic channel). A separate data service board is generally required in the subscriber unit to provide this service. It is envisaged that data can be broadcast in an unsolicited manner, e.g. for advertising. The message is received on the control channel preceded by an address. From the address it is a simple matter to identify that the message is a broadcast SMS (as opposed to a point-to-point i.e. personal SMS). In accordance with a further aspect of the present invention, display of broadcast SMS messages is disabled in accordance with an instruction stored in the card. This instruction is preferably user-settable.

As a further feature, certain incoming calls could be disabled in accordance with information stored in the card. This is only, of course possible where the source of the call is identified, e.g. in an ISDN format of service.

Other functions which may be activated or not depending on the programming of the memory card may include use of a fax machine or other data equipment and/or use of an answering machine, or use of other peripheral equipment.

The card 20 has been described as a card mounted microprocessor and memory. It will be appreciated that the card 20 may be in the form of simple semiconductor memory card or a magnetic card. A smart card provides a higher degree of security against unauthorized access.

It will, of course, be understood that the above description has been given by way of example only and that modifications of detail can be made within the scope of the invention.

We claim:

1. A radio capable of operating with a set of incoming and outgoing operating functions within a system network having a system network operator, said radio comprising:
    removable memory means for storing radio function selecting information and a radio user validation code, said removable memory means having a first set of memory locations that are predefined by the system network operator and a second set of memory locations that are user definable;
    memory receiving means for temporarily receiving said removable memory means;
    radio function control means coupled to said memory receiving means for enabling said radio for communication with a radio communications system in response to said removable memory means and radio user validation code including at least enabling said radio for receipt of incoming calls; and
    said radio function control means are arranged to activate particular operating functions of the radio in response to the radio function selecting information stored in said removable memory means.

2. A radio according to claim 1 further comprising a memory having a plurality of storage locations for storing information including at least telephone numbers, the radio characterized in that said radio function control means disallows access to at least one of said plurality of storage locations.

3. A radio according to claim 2 wherein access includes both read and write access.

4. A radio according to claim 2 wherein access includes write access only.

5. A radio according to claim 2 wherein said radio function control means disallows the radio user write access to a predetermined set of the telephone numbers stored in said memory.

6. A radio according to claim 1 wherein said radio function control means are arranged to activate the radio for receipt of incoming calls and to deactivate all outgoing call functions in response to the radio function selecting information stored in said removable memory means.

7. A radio according to claim 1 further comprising a keypad having a plurality of numerical keys and a plurality of feature keys wherein said radio function control means allows the use of a subset only of said plurality of feature keys in dependence on said radio function selecting information.

8. A radio according to claim 7 wherein one of said plurality of feature keys is an encryption selector key.

9. A radio according to claim 7 wherein one of said plurality of keys is a memory selector key.

10. A radio according to claim 1 wherein said radio function control means disallows the radio user from initiating international calls in dependence on said radio function selecting information.

11. A radio according to claim 8 wherein said radio function control means also disallows the radio user from initiating trunk calls in dependence on said radio function selecting information.

12. A radio according to claim 1, wherein said radio function control means disallows use of peripheral equipment.

13. A radio according to claim 1 in combination with a first removable memory means and a second removable memory means, wherein said first removable memory means stores first radio function selecting information for activating a first subset of said set of functions and said second removable memory means stores second radio function selecting information for activating a second different subset of said set of functions.

14. A radio according to claim 1 comprising:
output indicating means for providing user-discernable output indications, wherein said radio function control means are arranged to control said output indication means in response to the radio function selecting information stored in said removable memory means.

15. A radio according to claim 14, wherein said output indication means comprises a display, wherein a memory is provided for storing information for display in a plurality of languages, and wherein said radio function control means are arranged to select a language for display in accordance with the radio function control information.

16. A radio according to claim 14, wherein said output indication means comprises a display arranged to display selectable functions and wherein the set of selectable function which is displayed, out of the set of all the available selectable function, is controlled by the radio function control means in accordance with the radio function selecting information.

17. A radio according to claim 16, wherein the radio function selecting information is resetable by the user through a keypad on the radio.

18. A radio according to claim 14, further comprising means for receiving and displaying messages directed to the radio as well as to a plurality of other radios, means for identifying that the message is not specific to the radio and means for selectively preventing display of the message in accordance with the radio function selecting information.

19. A radio according to claim 14, comprising audible output means and volume control means for selection of the volume thereof in response to the radio function selecting information.

20. A radio according to claim 19, wherein the radio function selecting information is resetable by the user through a keypad on the radio.

21. A radio capable of operating within a set of incoming and outgoing call functions, said radio comprising:
removable memory means for storing radio functions selecting information that includes a first set of memory locations that are defined by a network system operator and a second set of memory locations that are user definable and a radio user validation code;
memory receiving means for temporarily receiving said removable memory means;
radio function control means coupled to said memory receiving means for enabling said radio for communication with a radio communications system in response to said removable memory means and radio user validation code including at least enabling said radio for receipt of incoming calls;
a memory having a plurality of storage locations for storing information including at least telephone numbers; and
said radio function control means are arranged to activate a subset of said call functions within said set of call functions in response to the radio function selecting information stored in said removable memory means and in that said radio function control means disallows the radio user write access to a predetermined set of the telephone numbers stored in said memory.

22. A radio capable of operating within a set of incoming and outgoing call functions, said radio comprising:
removable memory means for storing radio functions selecting information that includes a first set of memory locations that are defined by a network system operator and a second set of memory locations that are user definable and a radio user validation code;
memory receiving means for temporarily receiving said removable memory means;
radio function control means coupled to said memory receiving means for enabling said radio for communication with a radio communications system in response to said removable memory means and radio user validation code including at least enabling said radio for receipt of incoming calls;
a memory having a plurality of storage locations for storing information including at least telephone numbers; and
said radio function control means are arranged to activate the radio for receipt of incoming calls and to deactivate all outgoing call functions in response to the radio function selecting information stored in said removable memory means.

* * * * *